US012586345B1

(12) United States Patent
Mohanty et al.

(10) Patent No.: US 12,586,345 B1
(45) Date of Patent: Mar. 24, 2026

(54) WORKLOAD REDUCTION FOR NON-MAXIMUM SUPPRESSION OPERATION

(71) Applicant: Amazon Technologies, Inc., Seattle, WA (US)

(72) Inventors: Abinash Mohanty, San Jose, CA (US); Randy Renfu Huang, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/152,664

(22) Filed: Jan. 10, 2023

Related U.S. Application Data

(63) Continuation of application No. 16/949,749, filed on Nov. 12, 2020, now Pat. No. 11,562,554.

(51) Int. Cl.
*G06V 10/75* (2022.01)
*G06N 3/04* (2023.01)
*G06V 10/22* (2022.01)
*G06V 10/26* (2022.01)
*G06V 30/194* (2022.01)

(52) U.S. Cl.
CPC ............. *G06V 10/751* (2022.01); *G06N 3/04* (2013.01); *G06V 10/22* (2022.01); *G06V 10/26* (2022.01); *G06V 30/194* (2022.01)

(58) Field of Classification Search
CPC ................................ G06N 3/04; G06V 30/194
See application file for complete search history.

(56) References Cited

U.S. PATENT DOCUMENTS

| | | | | |
|---|---|---|---|---|
| 2003/0053677 A1* | 3/2003 | DeYong | ............... | G06T 7/0008 |
| | | | | 382/149 |
| 2016/0155011 A1* | 6/2016 | Sulc | ..................... | G06V 10/757 |
| | | | | 382/103 |
| 2019/0354598 A1* | 11/2019 | Graff | ................. | G06F 16/24578 |
| 2020/0074690 A1* | 3/2020 | Fukagai | ................. | G06V 10/94 |
| 2020/0250812 A1* | 8/2020 | Ceccaldi | ............... | G06V 10/82 |
| 2020/0279128 A1 | 9/2020 | Hoehne et al. | | |
| 2020/0349707 A1* | 11/2020 | Hosseini | ........... | G06V 10/7788 |
| 2021/0342586 A1 | 11/2021 | Fleisig et al. | | |

OTHER PUBLICATIONS

U.S. Notice of Allowance dated Sep. 15, 2022 in U.S. Appl. No. 16/949,749.

* cited by examiner

*Primary Examiner* — Akwasi M Sarpong
*Assistant Examiner* — Michael L Burleson
(74) *Attorney, Agent, or Firm* — Weaver Austin Villeneuve & Sampson LLP

(57) ABSTRACT

A technique for improving the computational time for performing a non-maximum suppression operation may include receiving a request to perform a non-maximum suppression operation on a set of candidate predictions of a computing task, and performing a statistical analysis on a set of confidence scores to reduce the set of candidate predictions. Candidate predictions from the reduced set of candidate predictions are provided as the result of the non-maximum suppression operation.

17 Claims, 13 Drawing Sheets

ACCELERATION
ENGINE
450

HOST
PROCESSOR
402

ACCELERATION
ENGINE
550

HOST
PROCESSOR
502

ACCELERATION
ENGINE
650

PROCESSOR
602

700

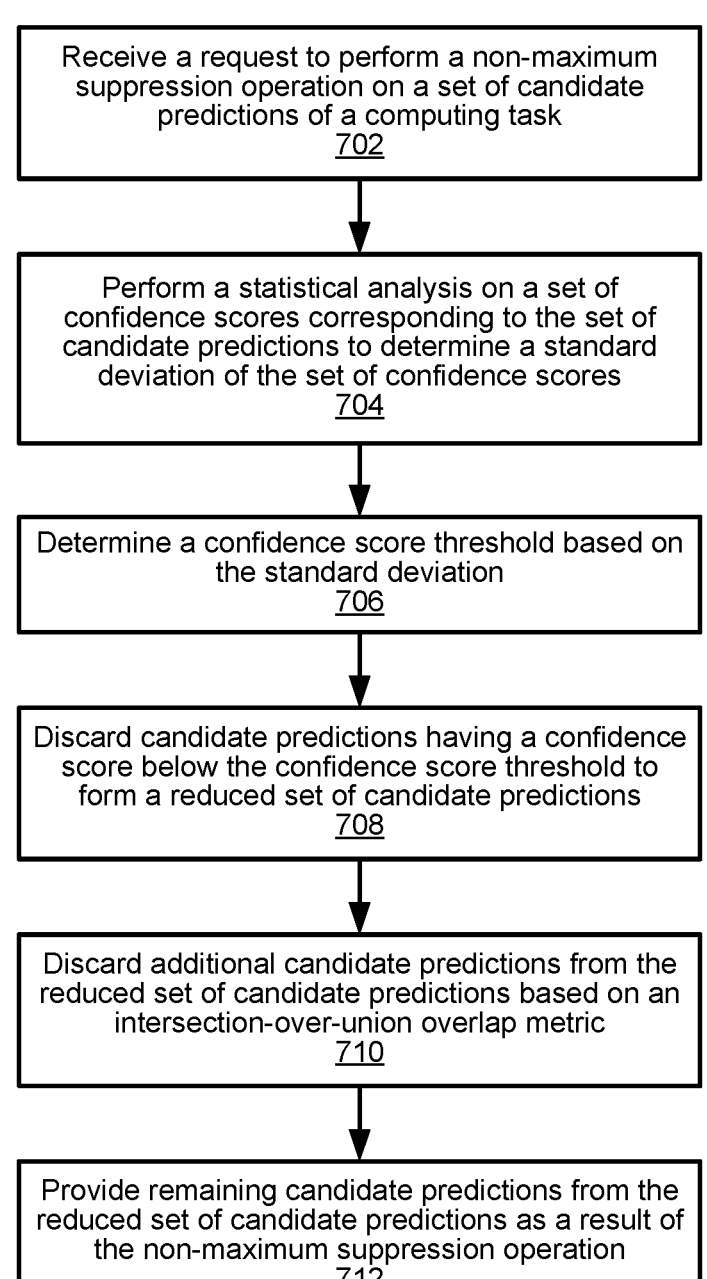

Receive a request to perform a non-maximum
suppression operation on a set of candidate
predictions of a computing task
702

Perform a statistical analysis on a set of
confidence scores corresponding to the set of
candidate predictions to determine a standard
deviation of the set of confidence scores
704

Determine a confidence score threshold based on
the standard deviation
706

Discard candidate predictions having a confidence
score below the confidence score threshold to
form a reduced set of candidate predictions
708

Discard additional candidate predictions from the
reduced set of candidate predictions based on an
intersection-over-union overlap metric
710

Provide remaining candidate predictions from the
reduced set of candidate predictions as a result of
the non-maximum suppression operation
712

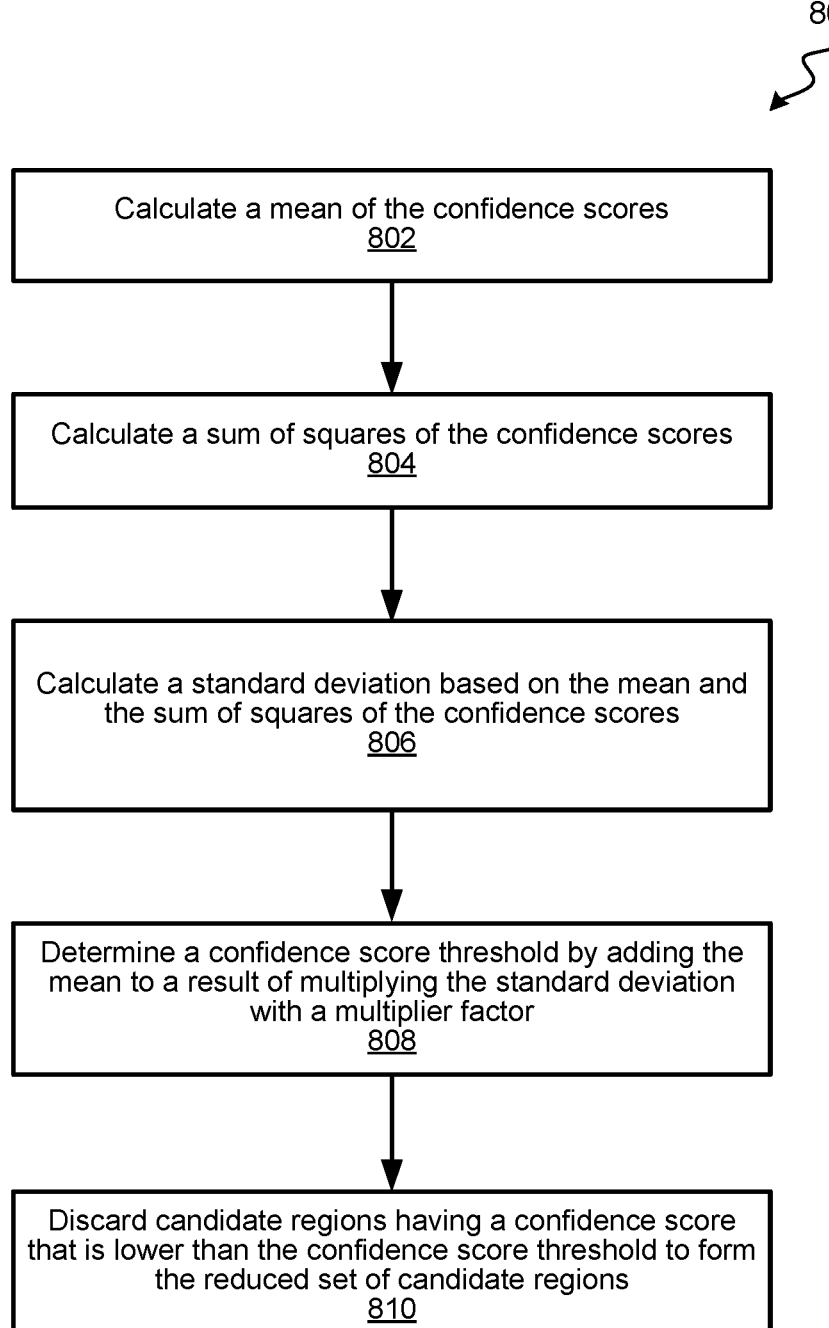

Calculate a mean of the confidence scores
802

Calculate a sum of squares of the confidence scores
804

Calculate a standard deviation based on the mean and
the sum of squares of the confidence scores
806

Determine a confidence score threshold by adding the
mean to a result of multiplying the standard deviation
with a multiplier factor
808

Discard candidate regions having a confidence score
that is lower than the confidence score threshold to form
the reduced set of candidate regions
810

Receive a description of a neural network that includes
performing a non-maximum suppression operation on a
set of candidate predictions of a computing task
1002

Generate a first set of computer readable code to
calculate a standard deviation of a set of confidence
scores corresponding to the set of candidate
predictions, determine a confidence score threshold
based on the standard deviation, and discard candidate
predictions having a confidence score below the
confidence score threshold to form a reduced set of
candidate predictions
1004

Generate a second set of computer readable code to
derive a result of the non-maximum suppression
operation by discarding additional candidate predictions
from the reduced set of candidate predictions based on
an intersection-over-union overlap metric
1006

FIG. 10

WORKLOAD REDUCTION FOR NON-MAXIMUM SUPPRESSION OPERATION

CROSS-REFERENCE TO RELATED APPLICATIONS

This application is a continuation of U.S. patent application Ser. No. 16/949,749, filed Nov. 12, 2020, issued as U.S. Pat. No. 11,562,554 on Jan. 24, 2023, and entitled "WORKLOAD REDUCTION FOR NON-MAXIMUM SUPPRESSION OPERATION," the content of which is incorporated herein by reference in its entirety.

BACKGROUND

Artificial neural networks are computing systems with an architecture based on biological neural networks. Artificial neural networks can be trained, using training data, to learn how to perform a certain computing task for an application. The trained artificial neural network can then perform the computing task, for example, to generate an inference from input data. Computing tasks that neural networks can perform may include human-like functions such as visual and audial perception.

BRIEF DESCRIPTION OF THE DRAWINGS

Various embodiments in accordance with the present disclosure will be described with reference to the drawings, in which:

FIG. 7 illustrates a flow diagram of an example of a process for performing a non-maximum suppression operation;

FIG. 8 illustrates a flow diagram of an example of a process for search space reduction for a non-maximum suppression operation;

FIG. 10 illustrates a flow diagram of an example of a process for generating code for a non-maximum suppression operation;

DETAILED DESCRIPTION

Figure 1:
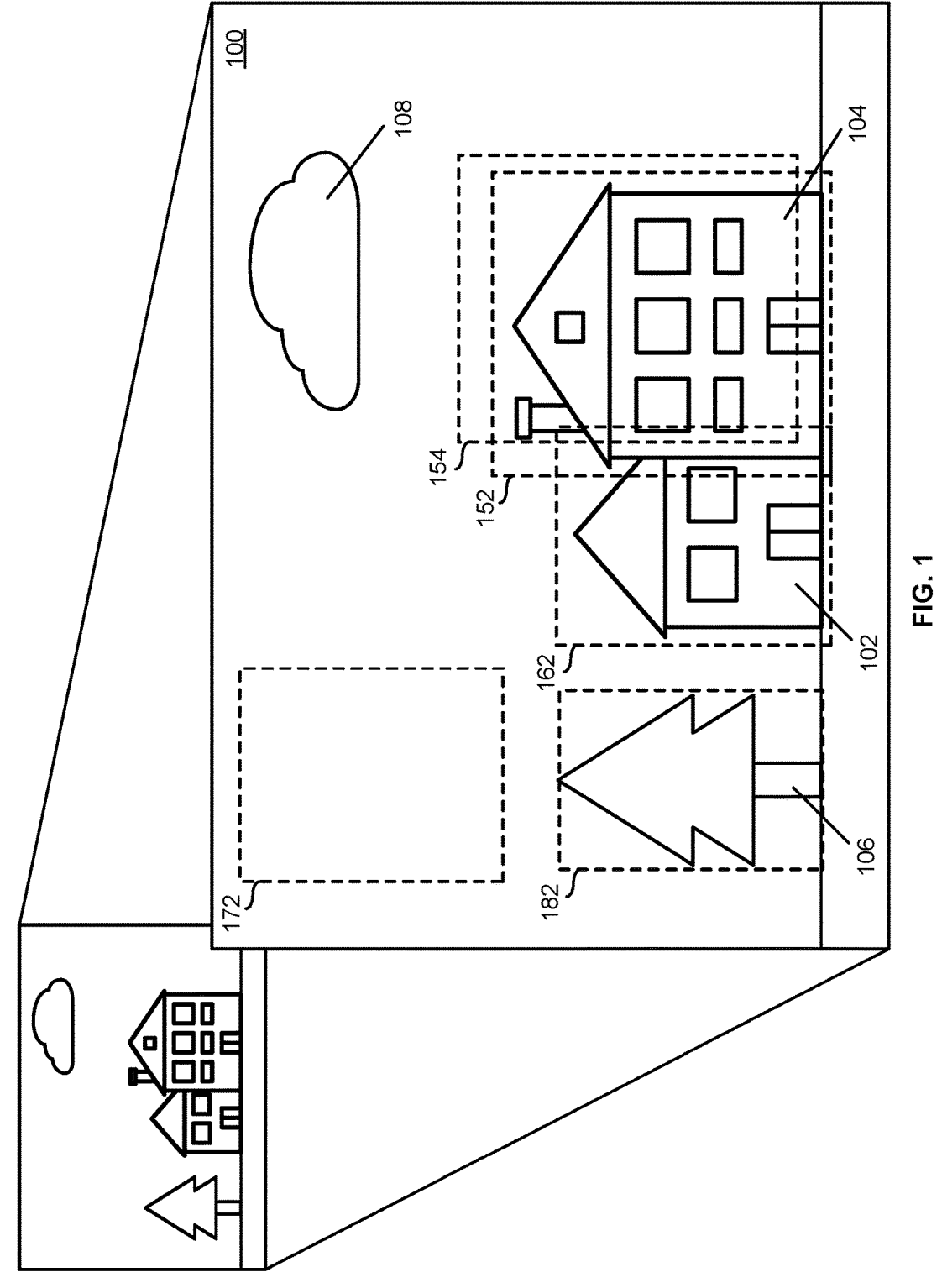
FIG. 1 illustrates an example of an image that can be analyzed by an object detection algorithm.

One type of operation that a neural network can execute to facilitate performance of a computing task is the non-maximum suppression (NMS) operation. The purpose of NMS is to reduce the search space by suppressing or removing a majority of predictions while retaining or keeping the top scoring or best performing predictions. In other words, NMS keeps the best candidate among a set of overlapping candidates, so that only the best candidates are used in subsequent stages of the computing task.

NMS can be used, for example, in object detection neural networks. Object detection is a computer vision technique to identify and locate objects in an image. The image can be a still image, or an image that is part of a series of frames forming a video. In object detection tasks, an image is processed by analyzing candidate regions (e.g., boundary boxes) in the image, and determining if an object of interest is depicted and bounded by the candidate region. Various techniques can be used to generate the candidate regions. For example, a sliding window technique can be used to shift a boundary box across the image. To identify objects of varying sizes, the sliding window technique can be repeated by scaling the image or the boundary box. Another technique to generate the candidate regions is to use image segmentation to identify pixel changes in the image to find potential contours and edges of objects in the image.

With large input sizes (e.g., a high-resolution image with many depicted objects), checking each candidate region using a classifier becomes impractical, because the total number of candidates can be in the millions. This makes NMS an effective technique to reduce the search space (number of candidates on which classifier operates) by removing or suppressing candidates with lower chances of having an object of interest in them. Execution of the NMS operation may involve two main parts:

(1) Sort all the candidate predictions based on their respective confidence scores representing a metric indicating the probability that the candidate prediction corresponds to a ground truth (e.g., a candidate region containing an object of interest), and pick a certain number of top scoring candidate predictions. For N number of candidate predictions in which the top K number of candidate predictions are picked, this first part of executing the NMS operation can have a computational time complexity of $O(N\log(N))$ due to the sorting operation.

(2) Starting at the top of the list of the chosen candidate predictions from above, remove any remaining candidate predictions with an intersection-over-union (IoU) overlap greater than a threshold value. This second part can be iteratively performed until a certain number of probable candidate predictions remain, or until all the chosen candidate predictions have been processed. This second part of executing the NMS operation can have a computational time complexity of $O(K^2)$.

The first part is performed because the second part has polynomial time complexity, so reducing the search space from N number of candidate predictions to K number of candidate predictions can greatly impact the total execution time of the NMS operation.

Although reducing the search space from N to K can provide some improvement in execution time, the search space reduction still requires a time complexity of $O(N\log(N))$ because of the sorting operation. Furthermore, accelerators tailored for neural network computations (e.g., neural network processors, graphics processing units (GPUs), etc.) may not handle sorting operations efficiently. As such, the NMS operation is typically performed by a host processor instead of a neural network accelerator. In order for a host processor to perform the NMS operation, the full set of tensors representing all N candidate predictions have to be transferred from the accelerator memory to the host memory such as an off-chip dynamic random access memory (DRAM). When there are millions of candidate regions, the memory overhead to transfer the full set of tensors to the host memory can introduce significant additional latency, which may offset the execution time savings provided by reducing the search space. Thus, modifying the search space reduction algorithm to improve the computational time complexity and tailoring the reduction algorithm for execution in the accelerator can further improve performance by reducing the overall execution time of the NMS operation.

According to the techniques disclosed herein, instead of performing a sorting operation during the initial part of executing the NMS operation, a statistical analysis is performed on the full set of N candidate predictions to discard low scoring candidates. The statistical analysis calculates the mean and the standard deviation of the confidence score distribution. A confidence score threshold can then be determined by adding the mean to a result of multiplying the standard deviation with a multiplier factor. Candidate predictions having a confidence score below the confidence score threshold can be discarded such that only K number of candidate predictions are considered during the intersection-over-union analysis. The multiplier factor can be adjusted based on the number of K candidate predictions that are suitable for the particular application. The statistical analysis can have a linear computational time complexity of O(N). As compared to the sorting operation having a time complexity of O(Nlog(N)), the statistical analysis already provides a significant execution time improvement. Furthermore, the statistical analysis approach can also allow a neural network accelerator to perform the initial search space reduction within the accelerator. As a result, rather than having to transfer a full set of tensors representing all N number of candidate predictions from the accelerator memory to the host memory, only a small number of K candidate predications are transferred to the host memory. This further reduces the execution time by minimizing the latency attributed to the overhead for accessing the host memory.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of an image 100 that can be processed using a non-maximum suppression operation for object detection purposes. Image 100 depicts a first house 102, a second house 104, a tree 106, and a cloud 108. A computing system executing a neural network such as a convolution neural network can be tasked with identifying and locating any houses as objects of interest within image 100. The computing system may generate a series of candidate predictions as to possible locations of houses depicted in image 100. The candidate predictions may include candidate regions of varying sizes that are mapped over image 100 such as boundary boxes 152, 154, 162, 172, 182, etc. The convolution neural network can perform feature extraction (e.g., to find a triangular shape over a rectangular shape representing a pitched roof over a base structure) to determine the probability of each candidate region containing a house.

Referring to FIG. 1, boundary box 152 can be considered a ground truth because this candidate region bounds house 102 within the candidate region. Similarly, boundary box 162 can also be considered a ground truth because this candidate region bounds house 104. As such, the candidate predictions corresponding to boundary boxes 152 and 162 are expected to have the highest confidence scores. In contrast, boundary box 172 does not contain any features resembling a house, and thus this candidate prediction is expected to have a low confidence score. Boundary box 182 contains tree 106, which is not a house but shares some similar features such as a triangular top and rectangular base. As such, the candidate prediction corresponding to boundary box 182 may still have a high confidence score even though it does not actually contain a house. Boundary box 154 is another example of a candidate prediction that is expected to have a high confidence score because part of house 104 is bounded by boundary box 154. It should be understood that boundary boxes 152, 154, 162, 172, and 182 are just a very small subset of the total number of candidate predictions, and there can be thousands or even millions of candidate predications for a given image.

The non-maximum suppression (NMS) operation can be used to eliminate candidate predictions that are unlikely to contain the object of interest as well as to minimize the number of duplicate predictions. The first part of the NMS operation is to discard a large number of low scoring candidate predictions such as boundary box 172. For the remaining candidate predictions that have a relatively high confidence score such as boundary boxes 152, 154, 162 and 182, an intersection-over-union analysis is performed to discard candidate predictions with a large overlap. For example, boundary boxes 152 and 154 are covering the same object of interest, and thus boundary box 154 with the lower confidence score can be eliminated. The intersection-over-union (IoU) analysis determines the ratio of the overlap between a candidate region and a region of interest to the union of the two regions, and if the ratio is above a threshold value (e.g., 0.5), the candidate region is discarded. This is done because there is sufficient overlap between the two regions to indicate that the two regions are covering the same object of interest. In image 100, boundary box 154 has a substantial overlap with boundary box 152 such that the IoU ratio would be high, and thus boundary box 154 can be discarded. In contrast, although boundary box 152 has some overlap with boundary box 162, the amount of overlap is small to yield a low IoU ratio. This indicates that boundary boxes 152 and 162 are covering two different objects of interest that are next to and overlap with each other. As such, both boundary boxes 152 and 162 are kept by the IoU analysis.

At the completion of the NMS operation, the candidate predictions remaining may include boundary boxes 152, 162, and 182 corresponding to potential objects of interest in image 100. These candidate predictions can then be passed to a classifier for a more detailed analysis to identify the class of object contained in each boundary box. The classifier may identify boundary box 162 as depicting a first house 102, boundary box 152 as depicting a second house 104, and boundary box 182 as depicting not a house but a tree 106.

Figure 2:
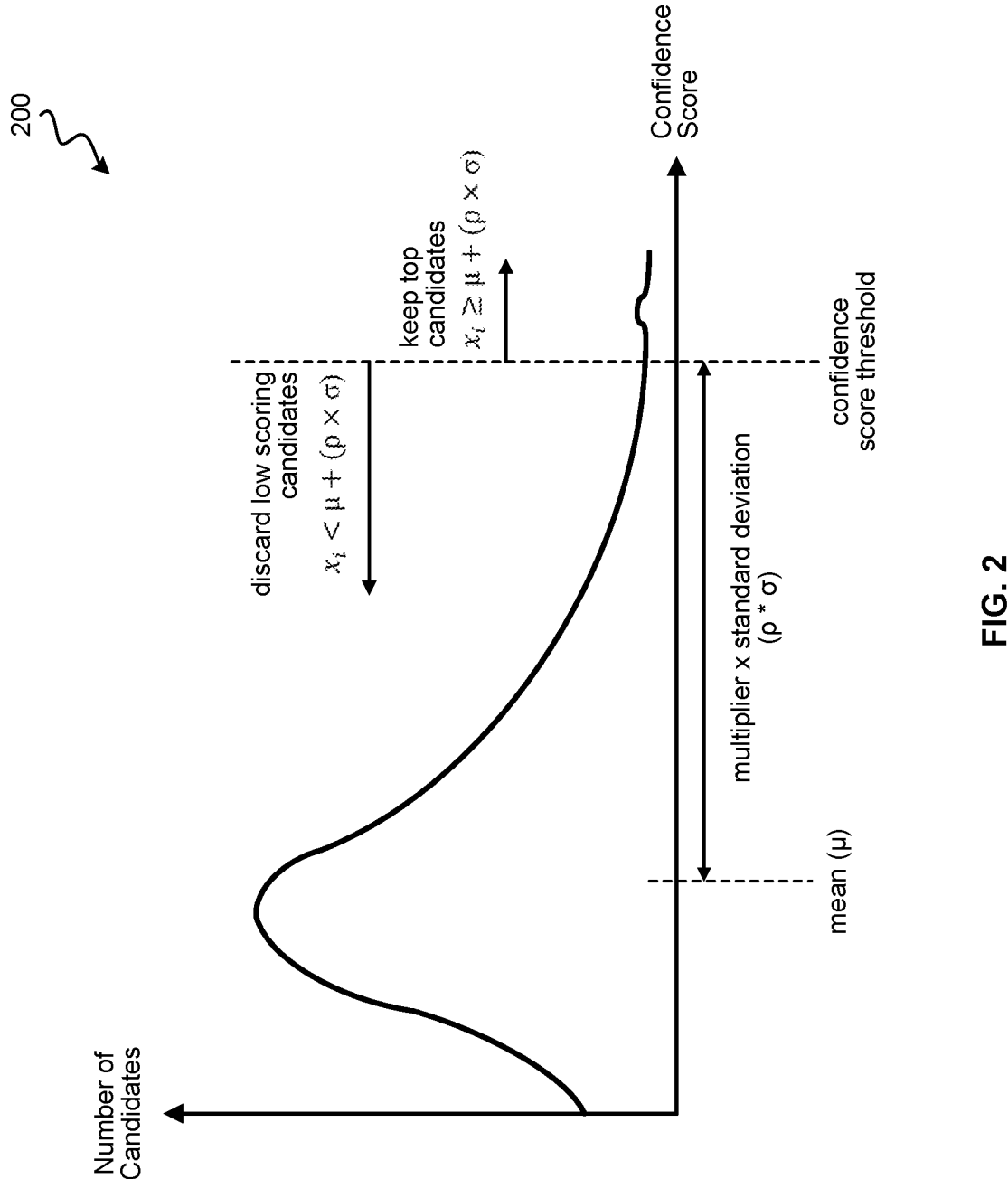
FIG. 2 illustrates an example of a confidence score distribution of candidate predictions of an image.

FIG. 2 illustrates an example of a confidence score distribution 200 of candidate predictions in a typical image. Generally, over 95% of the candidate predictions may lack significant overlap with an object of interest, and their confidence scores will be low as compared to candidates having significant overlap with regions of interest. The confidence score distribution of all candidate predictions in an image for object detection typically resemble a Gaussian-like distribution similar to distribution 200. There can be a minor ridge at the tail end of the high confidence scores for candidate predictions that are near the ground truth. The good candidate predictions having a high enough confidence score to be kept for the IoU analysis will be in the high score tail end of the distribution. Candidate predictions with a low confidence score that can be discarded during the initial search space reduction will cover the majority of the distribution.

Given that the confidence score distribution typically resembles a Gaussian-like distribution, instead of sorting the candidate predictions by their prediction scores, a statistical analysis can be performed to pick the top candidate predictions. The statistical analysis is used to determine a confidence score threshold. Candidate predictions having a confidence score below the confidence score threshold can be discarded during the initial search space reduction, and the remaining candidate predictions at the high score tail end are kept for the IoU analysis. For example, the statistical analysis may include calculating a mean p and a standard deviation a of the confidence score distribution. The confidence score threshold can then be determined by adding the mean p to a result of multiplying the standard deviation a with a multiplier factor $\rho$. Candidate predictions having a confidence score $x_i$ below the confidence score threshold (represented as the region $x_i < \mu + (\rho \times \sigma)$ in FIG. 2) can be discarded, and candidate predictions having a confidence score $x_i$ equal to or above the confidence score threshold (represented as $x_i > \rho + (\rho \times \sigma)$ in FIG. 2) can be kept for the subsequent IoU analysis. The multiplier factor $\rho$ can be a value, for example, between 1 and 3, and can typically have a value of 2.5. In some implementations, the multiplier factor $\rho$ can be a user configurable parameter that is set based on a target number of top candidate predictions K to keep for IoU analysis suitable for the particular application.

To calculate the mean and standard deviation of the confidence score distribution, a sum of the confidence scores and a sum of squares of the confidence scores can be calculated.

$$\text{sum of confidence scores} = \sum_{i=1}^{N} x_i$$

$$\text{sum of squares of confidence scores} = \sum_{i=1}^{N} x_i^2$$

The mean $\mu$ can be calculated as:

$$\mu = \frac{1}{N} \sum_{i=1}^{N} x_i$$

The standard deviation can then be calculated by taking the square root of the variance $\sigma^2$, which can be calculated as:

$$\sigma^2 = \frac{1}{N} \sum_{i=1}^{N} (x_i - \mu)^2 = \frac{1}{N} \sum_{i=1}^{N} (x_i^2 - 2\mu x_i + \mu^2)$$

$$= \left( \frac{1}{N} \sum_{i=1}^{N} x_i^2 \right) - 2\mu \left( \frac{1}{N} \sum_{i=1}^{N} x_i \right) + \mu^2$$

-continued $$= \left( \frac{1}{N} \sum_{i=1}^{N} x_i^2 \right) - \mu^2$$

The calculation of the mean and standard deviation each has a linear computational time complexity of O(N). Discarding candidate predications having a confidence score below the confidence score threshold also has a linear computational time complexity of O(N). Hence, the initial search space reduction using the statistical analysis technique has an overall linear time complexity of O(N). By using the statistical analysis instead of the sorting operation to perform the initial search space reduction, a significant reduction in processing time can be achieved, especially for implementations in which the number of candidate predictions Nis large.

Figure 3:
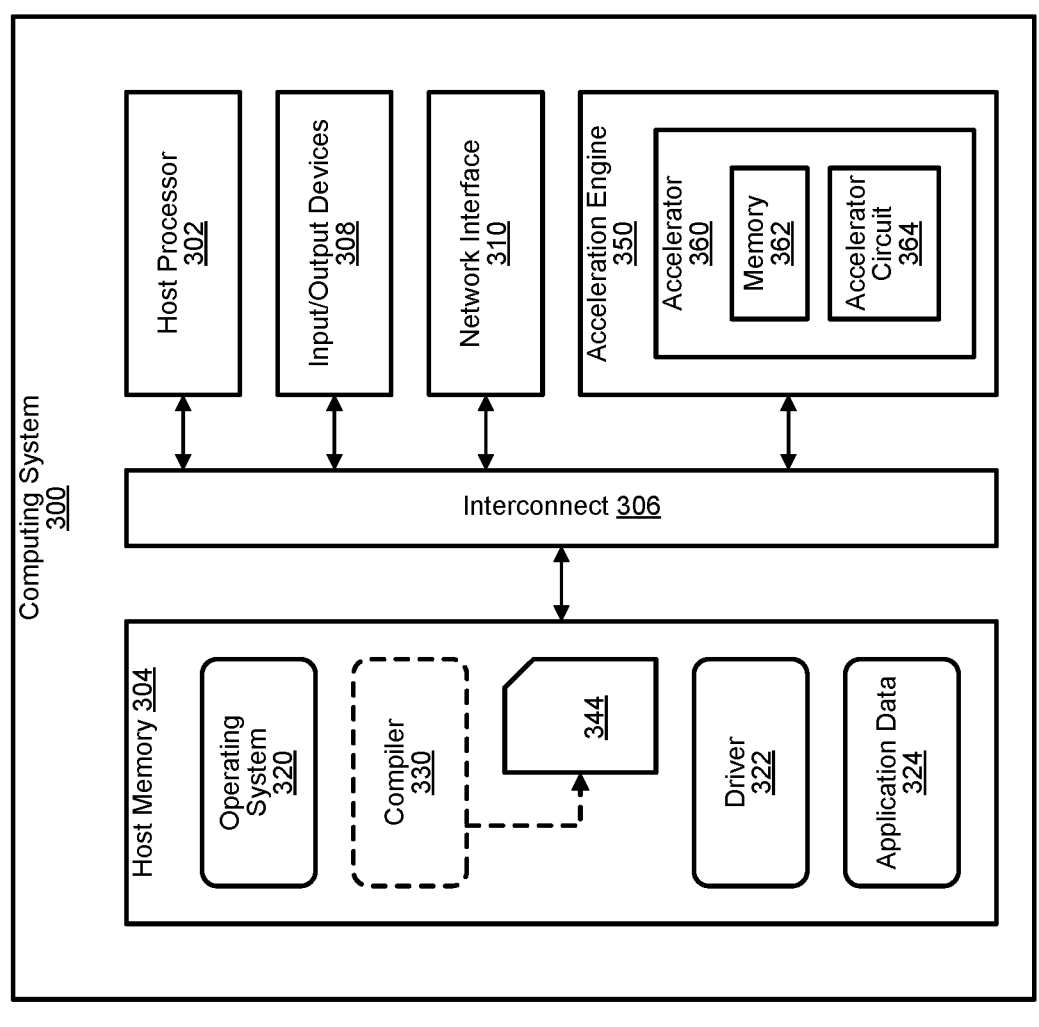
FIG. 3 illustrates a block diagram of an example of a computing device.

FIG. 3 illustrates a block diagram of an example of a computing system 300 that can be used to execute a non-maximum suppression operation. Computing system 300 includes a host processor 302, a host memory 304, various Input/Output (I/O) devices 308, and at least one network interface 310. In the example of FIG. 3, computing system 300 also includes an acceleration engine 350, which is an integrated circuit device that can accelerate certain operations or computations performed by the computing system 300. The various components of computing system 350 can communicate with each other via an interconnect 306. Computing system 300 can be implemented as a server in a data center, a desktop computer, a laptop computer, a tablet computer, or a smartphone, among other examples. In some examples, operations or components discussed below as being performed or included in the computing system 300 can be performed or included in other computing devices. For example, compiler 330 can be executed on a different computing device to generate the compiled code 344, and the compiled code 344 can be executed by host processor 302 and acceleration engine 350 of computing system 300.

Processor 302 is an integrated circuit device that can execute program code, in the form of instructions. The program code can be for various software applications or tools, such as an operating system 320 or the illustrated compiler 330. While the processor 302 is executing a program, the instructions for the program can be stored in host memory 304. The instructions can also be stored elsewhere, such as on a storage device, and can be loaded into the host memory 304 when needed by host processor 302. Host processor 302 can also use host memory 304 for temporary storage of other data on which host processor 302 is operating. For example, host memory 304 may store application data 324 that is being used by host processor 302 to perform certain computing tasks. In various examples, host memory 304 can be a volatile memory type, such as a type of random access memory, though non-volatile memory types such as flash memory can, alternatively or additionally, be used for host memory 304. Computing system 300 may also include or be coupled to a storage device (not shown). The storage device can be, for example, a magnetic disk drive, a solid state drive, or an optical drive, among other examples. The storage device can be non-transitory, such that program code and other data stored on the storage device remains present when computing system 300 is not powered on. Some or all of the components shown as being stored in host memory 304 can be transferred between the storage device and host memory 304 as needed.

Input/Output devices 308 are components that can add functionality to computing system 300. Input/Output devices 308 can include user input and output devices, such as keyboards, mice, touch screens, microphones, display screens, speakers, printers, and scanners, among other examples. Network interface 310, which can be implemented using a network interface card, can also be considered as a type of I/O device that provides access to one or more networks. Network interface 310 can include, for example, a physical port for connecting a network cable and/or wireless antennas for communicating with Wi-Fi and/or cellular networks.

Acceleration engine 350 can be considered as another type of peripheral or I/O device. Acceleration engine 350 is a device that is purpose-built to perform certain operations that can be performed by host processor 302, but can be performed faster by acceleration engine 350. For example, acceleration engine 350 can include an accelerator 360 such as a neural network accelerator to perform large scale, parallel computations of a neural network more efficiently than when the computations are performed by host processor 350. As another example, accelerator 360 can be a graphics processing unit (GPU), and may be optimized to perform the computations needed for graphics rendering. Other examples of devices that can be implemented by the accelerator 360 include cryptographic accelerators, compression and decompression accelerators, 3-D accelerators, regular expression accelerators, security accelerators, and others. Acceleration engine 350 can also include more than one accelerator 360. Each accelerator 360 may have an accelerator memory 362 that is use to store data being processed by an accelerator circuit 364.

In various examples, acceleration engine 350 can execute program code to perform certain operations. For example, when acceleration engine 350 is a neural network accelerator, the acceleration engine 350 can be programmed to execute a particular neural network, such as one that performs object detection. As a further example, to support the execution of a neural network, the acceleration engine 350 can be programed to perform operations such as copying neural network parameters for the neural network from host memory 304 into acceleration engine 350, copying input data for the neural network from host memory 304 into the acceleration engine 350, and/or copying results from acceleration engine 350 into host memory 304, among other examples. The neural network parameters, input data, and results can be part of application data 324 shown in FIG. 3.

To generate program code for acceleration engine 350, computing system 300 (or another computing device) can execute compiler 330. Compilers, in general, are software programs that translate program code written in a human-readable language into a format (e.g., machine instructions) that can be read and processed by an integrated circuit device. In the example of FIG. 3, acceleration engine 350 can be a neural network accelerator and the compiler 330 is for compiling a neural network description into instructions to be executed by acceleration engine 350. When acceleration engine 350 implements a different type of accelerator, another compiler can be used.

Compiler 330 can be activated, for example, when the operating system 320 receives keyboard, mouse, touch-screen, voice commands, or other inputs from the Input/Output devices 308. The inputs can further include parameters for the compiler 330, such as input code to compile and configuration options for the compilation process. Once compiler 330 is activated, host processor 302 can load the instructions for compiler 330 into the host memory 304, and can execute the instructions. In some implementations, compiler 330 can be a multi-stage compiler having three compiling stages, with each stage performing different operations to produce compiled code 344. In other examples, the compiler 330 can combine the operations of the different stages into fewer stages, or can divide the operations of one of the stages into multiple stages.

The first stage can receive and process input code. The input code can describe a program in a high-level programming language, such as Java, C++, or TensorFlow, among many other examples. The input code can describe, for example, steps to perform object detection, or other operations. The input code can be obtained, for example, from a storage device, from host memory 304, or can be obtained from a network location, using the network interface 310. Processing of the input code can include sorting the operations described in the input code into layers, where the outputs of one layer provide the inputs to a next layer. Processing can also include identifying which steps are to be performed by host processor 302, and which steps are to be performed by acceleration engine 350. For example, host processor 302, through the execution of a driver 322, may need to perform steps such as configuring Direct Memory Access (DMA) descriptors for moving data into or out of acceleration engine 350, among other examples.

The output of the first stage can be organized, for example, in the layers, nodes, and connections between nodes of a neural network. The second stage can perform intermediate processing on this output. For example, the operations performed in any one layer, or at any one node in a layer, may be too many for the acceleration engine 350 to perform at the same time. Acceleration engine 350 may, for example, have a limited amount of local storage space for the data needed for a computation, or the computations may be more than what acceleration engine 350 can perform at one time. In this example, the first stage can break the operations of the layer or node down into smaller operations, which can fit into the acceleration engine's local memory and/or can fit into the computing capacity of the acceleration engine. Processing of the output of the first stage can include other steps, such as scheduling, or determining the order in which acceleration engine 350 and/or processor 302 will perform operations, among other examples.

In various examples, the output of the second stage includes the various steps to be performed by components of acceleration engine 350, in the order that the steps are to be performed. The output can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage can operate on the output of the second stage, and perform various steps before producing the instructions that are to be executed by acceleration engine 350. These steps can include, for example, removing redundant dependencies, resolving or handling dependencies between nodes by inserting synchronization instructions into the code, identifying possibly optimizations in memory usage or memory bandwidth usage, and other operations. In some implementations, the third stage can include a data scheduler to determine the order in which instructions are executed by acceleration engine 350.

The output of the third stage can be compiled code 344, which may include machine instructions in binary format. In some examples, compiled code 344 can be stored in the host memory 304. Alternatively or additionally, compiled code 344 can be copied to a storage device or to a network location. In some implementations, acceleration engine 350 can be located at a different computing system, in which case the compiled code 344 can be sent over the network interface 310 to the other computing system.

In the example of FIG. 3, computing system 300 can be executing a driver 322, which can also be referred to as a device driver or runtime driver, that manages acceleration engine 350. Driver 322 can provide an interface between applications executing on computing system 300 (or on another computing system) and acceleration engine 350. For example, driver 322 can provide an Application Program Interface (API) that defines functions for feeding input data to acceleration engine 350 and defining the operation to perform on the input data. In this and other examples, driver 322 can configure acceleration engine 350 to perform the operation. For example, driver 322 can identify a neural network that acceleration engine 350 is to execute, as well as the location in host memory 304 (or on a storage device) where the compiled code 344 for the neural network is located. Driver 322 can further load into acceleration engine 350 or cause acceleration engine 350 to load compiled code 344 as well as the input data on which the neural network is to operate, and/or can cause acceleration engine 350 to begin executing on the input data. Once acceleration engine 350 has finished, acceleration engine 350 can notify driver 322, and driver 322 can deliver a result back to the application that requested the result, for example, by copying the results from acceleration engine 350 to host memory 304.

According to some implementations, computing system 300 can be configured to execute a neural network involving a non-maximum suppression operation (e.g., for object detection). Compiler 330 may receive a set of instructions to perform convolution operations to assess confidence scores for candidate predictions, perform a NMS operation on the candidate predictions to select a subset of the candidate predictions, and then process the result of the NMS operation with a classifier to classify each of the remaining candidate predictions. Compiler 330 may split the instructions into different steps to be performed by host processor 302 and acceleration engine 350. For example, compiler 330 may generate compiled code to perform the convolution operations and the classifier using acceleration engine 350, and may generate compiled code to perform some or all of the NMS operation using host processor 302. In some implementations, the compiled code may invoke driver 322 to execute the NMS operation during runtime, and driver 322 may determine whether to perform some or all of the NMS operation using host processor 302. For example, if acceleration engine 350 has the capability to perform the statistical analysis to calculate the standard deviation of confidence scores associated with the candidate predictions, then the initial search space reduction of the NMS operation can be performed by acceleration engine 350. As another example, if the statistical analysis can be performed more efficiently in host processor 302, then compiler 330 or driver 322 may determine that the NMS operation is to be performed entirely in host processor 302.

Figure 4:
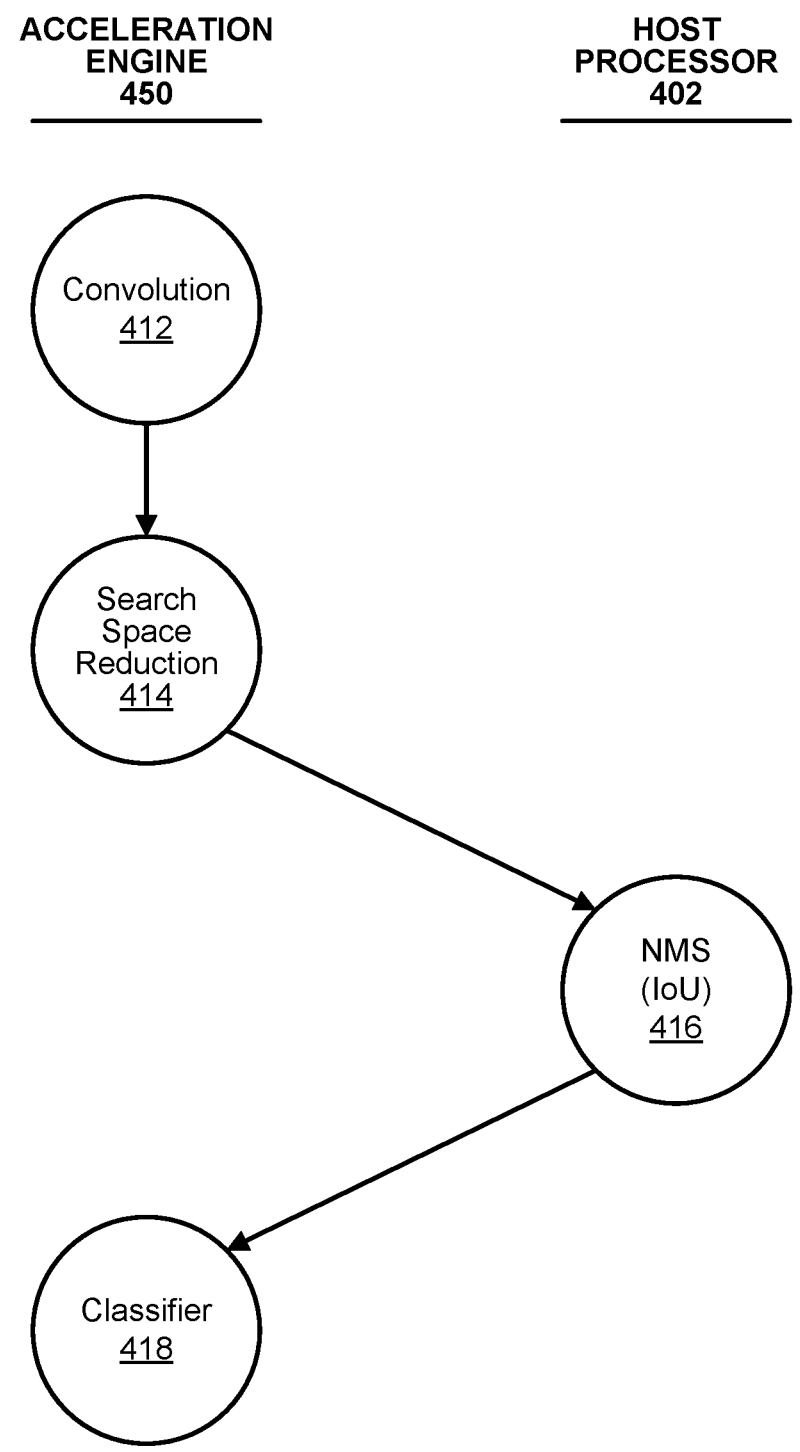
FIG. 4 illustrates a conceptual diagram of splitting the workload between a host processor and an acceleration engine.

FIG. 4 illustrates a conceptual diagram of how the workload can be divided between an acceleration engine 450 (e.g., acceleration engine 350) and a host processor 402 (e.g., host processor 302) of a computing system. In the implementation of FIG. 4, the convolution operation 412 are performed by acceleration engine 450. The convolution operation 412 may include generating candidate predictions (e.g., candidate regions such as boundary boxes in the case of object detection), and assessing for each candidate prediction a confidence score (e.g., representing the likelihood that an object of interest is in a candidate region). Thus, acceleration engine 450 can be configured to compute a set of confidence score corresponding to a set of candidate predications for a computing task (e.g., object detection) using a neural network model, and store a set of tensors corresponding to the set of candidate predictions in the accelerator memory of acceleration engine 450. As an example, in the case of object detection using boundary boxes, the set of tensors corresponding to the set of candidate predictions may include, for each candidate prediction, the confidence score and the coordinates of two endpoints of a diagonal axis of the boundary box.

Acceleration engine 450 may have the capability to perform the statistical analysis to determine a standard deviation of the confidence score distribution. As such, acceleration engine 450 may perform the initial search space reduction operation 414. During the initial search space reduction operation 414, the total number of candidate predictions can be significantly reduced (e.g., from a magnitude of $10^6$ down to $10^4$) to discard candidate predictions that have low confidence scores. Acceleration engine 450 can be configured to calculate a standard deviation of the set of confidence scores, and determine a confidence score threshold based on the standard deviation. The confidence score threshold can be determined, for example, by adding a mean of the set of confidence scores to a result of multiplying the standard deviation with a multiplier factor such as 2.5. Acceleration engine 450 can then transfer, from the accelerator memory to the host memory, a reduced set of tensors corresponding to candidate predictions having a confidence score at or above the confidence score threshold.

The NMS operation 416 including the intersection-over-union analysis can then be performed by host processor 402. For example, host processor 402 can be configured to perform the NMS operation to determine which of the candidate predictions corresponding to the reduced set of tensors stored in the host memory satisfies an intersection-over-union overlap metric. The intersection-over-union analysis can compute a ratio of the intersection between two candidate predictions to the union between those two candidate predictions, and candidate predictions have a ratio above a threshold value (e.g., 0.5) can be removed. Host processor 402 can then provide acceleration engine 450 an indication of which of the reduced set of tensors stored in the host memory satisfies the intersection-over-union overlap metric. The intersection-over-union analysis may further reduce the number of candidate predictions, for example, from a magnitude of $10^4$ down to $10^2$ or less.

The reduced set of candidate predictions can then be classified by the classifier operation 418 at acceleration engine 450. Thus, acceleration engine 350 can be configured to classify the candidate predictions corresponding to the tensors satisfying the intersection-over-union metric. For example, in the context of object detection, classifier operation 418 performed by acceleration engine 350 can determine which class of object that each of the remining candidate region contains.

Figure 5:
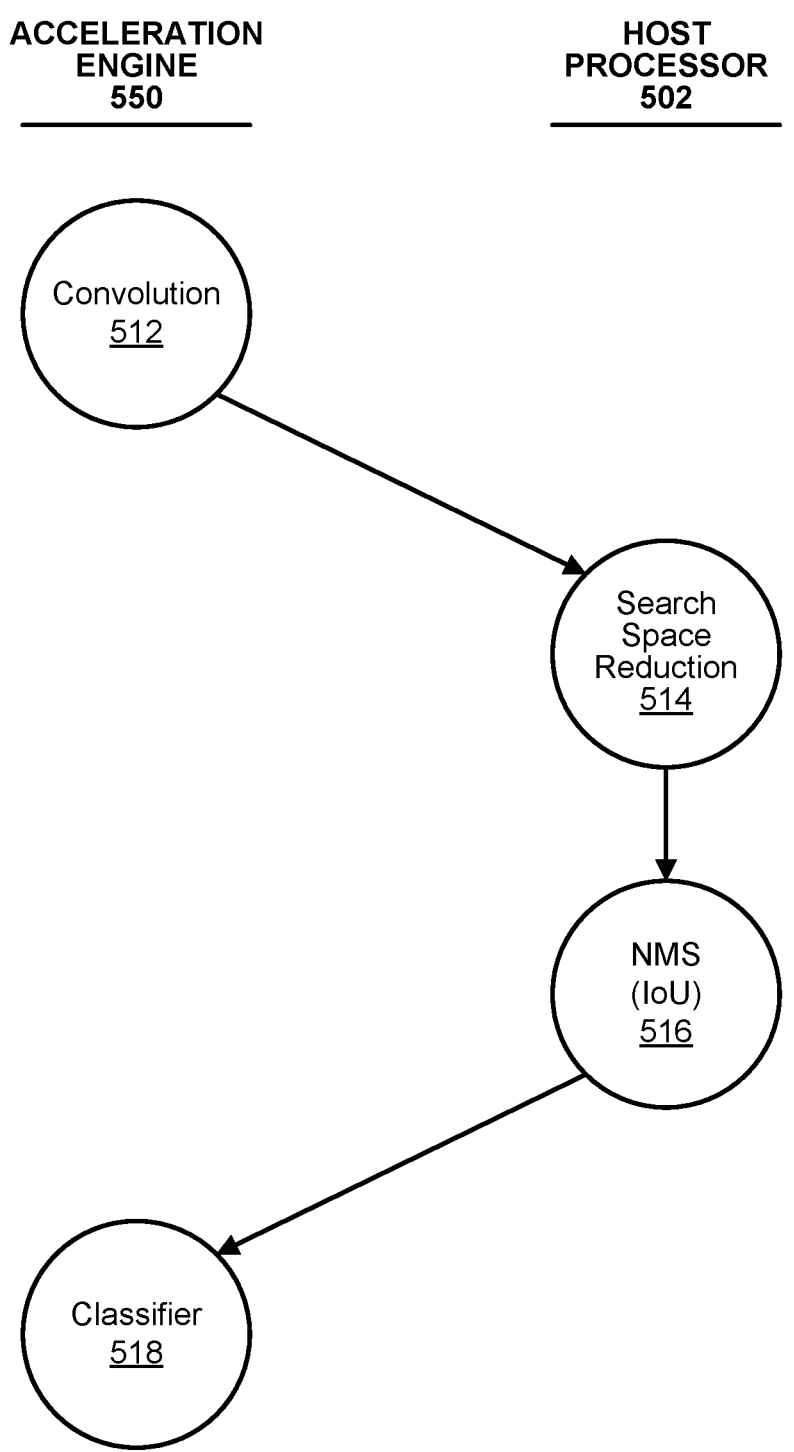
FIG. 5 illustrates another conceptual diagram of splitting the workload between a host processor and an acceleration engine.

FIG. 5 illustrates another conceptual diagram of how the workload can be divided between an acceleration engine 550 (e.g., acceleration engine 350) and a host processor 502 (e.g., host processor 302) of a computing system. In the implementation of FIG. 5, the search space reduction operation 514 is performed by host processor 502. In such implementations, host processor 502 can be configured to perform the initial search space reduction 514 and NMS including the IoU analysis operation 516. For host processor 502 to perform the search space reduction operation 514, acceleration engine 550 can be configured to transfer the entire set of tensors corresponding to the full set of candidate predictions from the accelerator memory to the host memory. Host processor 502 can then perform the standard deviation calculation, confidence score threshold determination, and selection of candidate predications having a confidence score above the confidence score threshold. The remaining operations are similar to FIG. 4, and thus a description f which need not be repeated.

As compared to FIG. 4, the difference between performing the initial search space reduction in the acceleration engine and performing the entire NMS operation in the host processor is that the amount of data that is transferred from the accelerator memory to the host memory can be significantly reduced (e.g., from a magnitude of $10^6$ down to $10^4$ tensors) if the initial search space reduction is performed by the acceleration engine. This reduction in data transfer can yield faster execution time because the latency associated with the memory transfer can be minimized. Even if the initial search space reduction is performed by the host processor, utilizing the statistical analysis instead of the sorting approach would still result in a reduction in execution time because the time complexity of the statistical analysis is linear as compare to the polynomial time of the sorting approach.

Figure 6:
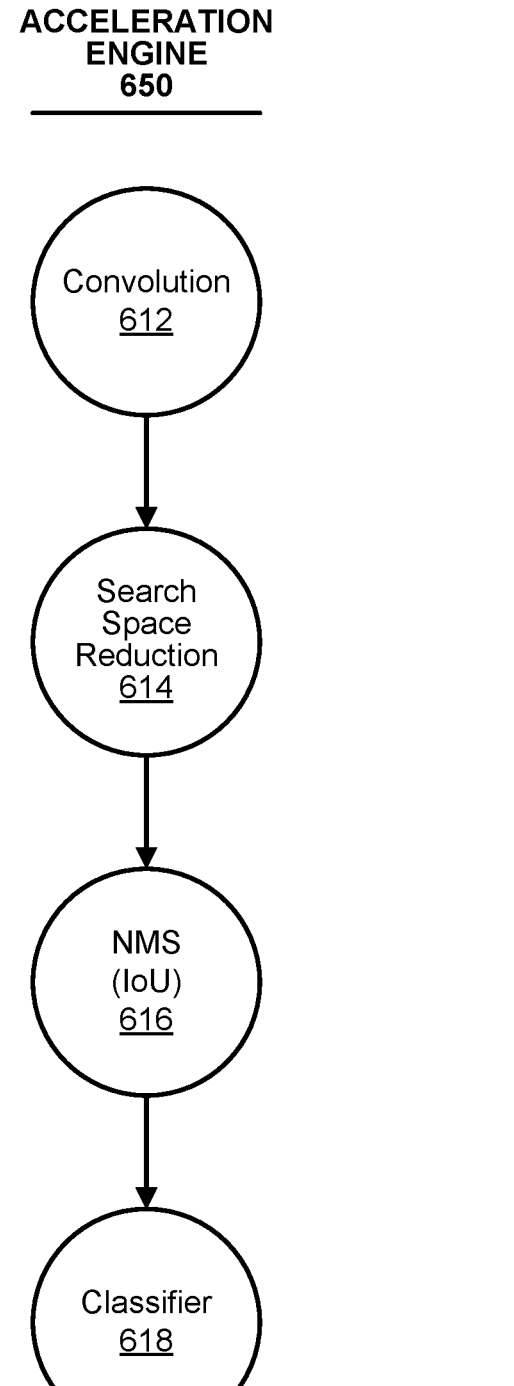
FIG. 6 illustrates a conceptual diagram of performing the workload in an acceleration engine.

FIG. 6 illustrates a conceptual diagram of another example of how the workload can be allocated between an acceleration engine 650 (e.g., acceleration engine 350) and a host processor 602 (e.g., host processor 302) of a computing system. In the implementation of FIG. 6, the convolution operation 612, the initial search space reduction operation 614, the NMS operation 616 including the IoU analysis, and the classifier operation 618 are all performed by acceleration engine 650. Acceleration engine 650 may include, for example, its own processor unit and/or an arithmetic logic unit to perform the NMS operation 616 including the IoU analysis. As such, a further reduction in computing time can be achieved by performing these operations in acceleration engine 650 because the memory latency to transfer tensors from acceleration engine 650 to host processor 602 can be eliminated.

FIG. 7 illustrates a flow diagram of an example of a process 700 for improving the execution time of performing a non-maximum suppression operation. The operations in process 700 can be split up between a host processor and an acceleration engine. In some implementations, process 700 can be performed by a host processor, or process 700 can be performed by an acceleration engine provided that the acceleration engine has the capability to do so. For example, an acceleration engine may include an arithmetic logic unit (ALU) to perform mathematical operations that differ from the usual neural network computations that are performed by a processing engine array of the acceleration engine. In such implementations, some or all of process 700 can be performed in the acceleration engine (e.g., by an accelerator circuit of the acceleration engine).

Process 700 may begin at block 702 by receiving a request to perform a non-maximum suppression operation on a set of candidate predictions of a computing task (e.g., candidate regions such as boundary boxes for object detection). The request can be received as an instruction to execute the non-maximum suppression operation, or as part of the compiled code to initiate the non-maximum suppression operation. The set of candidate predications can be associated with a set of confidence scores that is computed by a neural network model executed in the accelerator circuit of the computing system.

At block 704, a statistical analysis is performed on a set of confidence scores corresponding to the set of candidate predictions to determine a standard deviation of the set of confidence scores. In some implementations, the statistical analysis may have a linear time complexity. For example, the statistical analysis may include computing a mean of the confidence scores and a sum of squares of the confidence scores. The standard deviation can then be determined as a square root of subtracting a square of the mean from a result of dividing the sum of squares by the number of confidence scores in the set of confidence scores.

At block 706, a confidence score threshold is determined based on the standard deviation calculated at block 704. In some implementations, the confidence score threshold is determined by adding the mean to a result of multiplying the standard deviation with a multiplier factor. The multiplier factor can be, for example, a value between 1 and 3 such as 2.5. The multiplier factor can also be a user configurable parameter that can be varied depending on the application.

At block 708, candidate predictions having a confidence score below the confidence score threshold can be discarded to form a reduced set of candidate predictions. At block 710, additional candidate predictions can be discarded from the reduced set of candidate predictions based on an intersection-over-union overlap metric. For example, each of the additional candidate predictions being discarded may have an intersection-over-union overlap with a region of interest being greater than a threshold value (e.g., 0.5).

In some implementations, the statistical analysis and formation of the reduced set of candidate predictions in blocks 704 to 708 can be performed by an accelerator circuit of a computing system, and the discarding of the additional candidate predictions from the reduced set of candidate predictions of block 710 can be performed by a host processor of the computing system. In such implementations, tensors representing the reduced set of candidate predictions can be transferred from an accelerator memory used by the accelerator circuit to a host memory used by the host processor without including the discarded candidate predictions. In some implementations, the statistical analysis, formation of the reduced set of candidate predictions, and the discarding of the additional candidate predictions from the reduced set of candidate predictions in blocks 704-710 can be performed by a host processor of the computing system.

At block 712, the remaining candidate predictions from the reduced set of candidate predictions are provided as a result of the non-maximum suppression operation. A classifier can then operate on the remaining candidate predictions to assign a class to each of the remaining candidate predictions. For example, in object detection applications, the classifier can determine which class of objects that each of the remaining candidate regions contains. The classifier can be executed, for example, in the accelerator circuit of the computing system.

FIG. 8 illustrates a flow diagram of an example of a search space reduction process 800 for a NMS operation to reduce a set of candidate regions into a reduced set of candidate regions as part of an object detection task. Process 800 can be performed by a host processor or an acceleration engine of a computing device. Process 800 can be performed in response to receiving a request to perform a non-maximum suppression operation on a set of candidate regions of an image for detecting an object of interest. The set of candidate regions can be associated with a set of confidence scores, in which each of the confidence scores indicates a likelihood that the object of interest is in the corresponding candidate region.

Process 800 may begin at block 802 by calculating a mean p of the confidence scores as $$\frac{1}{N}\sum\nolimits_{i=1}^{N} x_i.$$

At block 804, a sum of squares of the confidence scores can be calculated as $$\sum\nolimits_{i=1}^{N} x_i^2.$$

Next, at block 806, the standard deviation of the confidence scores can be calculated as a square root of subtracting a square of the mean from a result of dividing the sum of squares by the number of confidence scores in the set of confidence scores according to $$\sqrt{\left(\frac{1}{N}\sum\nolimits_{i=1}^{N} x_i^2\right) - \mu^2}.$$

At block 808, a confidence score threshold is determined by adding the mean to a result of multiplying the standard deviation with a multiplier factor. At block 810, candidate regions having a confidence score that is lower than the confidence score threshold can be discarded to form the reduced set of candidate regions. In relation to FIG. 7, blocks 802 to 806 may correspond to the statistical analysis of block 704.

Figure 9:
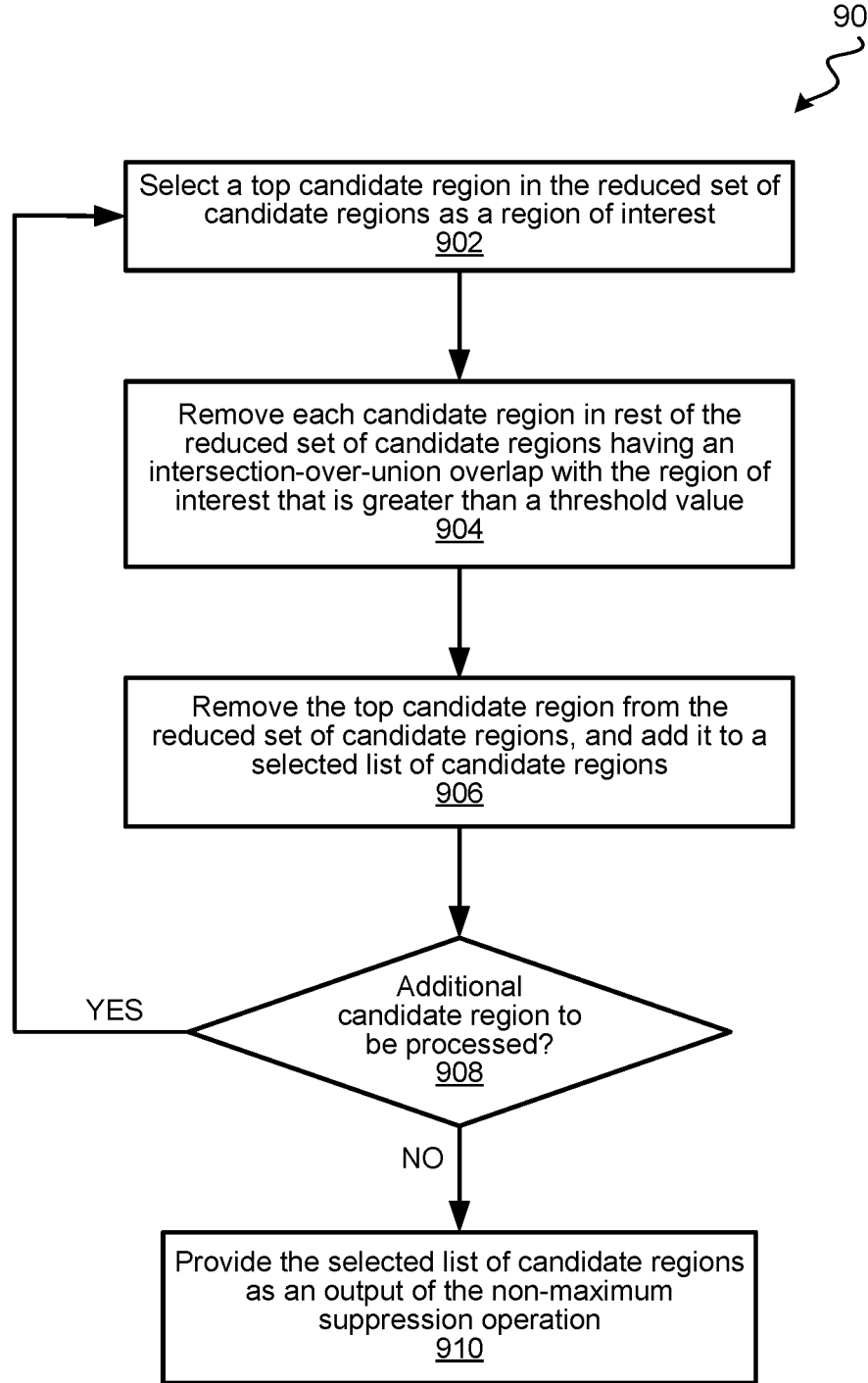
FIG. 9 illustrates a flow diagram of an example of a process for an intersection-over-union overlap analysis for a non-maximum suppression operation.

FIG. 9 illustrates a flow diagram of an example of a process 900 for a NMS operation to perform an intersection-over-union (IoU) analysis as part of an object detection task. Process 900 can be performed by a host processor or an acceleration engine of a computing device. Process 900 may operate on the reduced set of candidate regions outputted by process 800. Process 900 may include iteratively performing a set of operations to generate a selected set of candidate regions for a classifier.

Process 900 may begin at block 902 by selecting a top candidate region in the reduced set of candidate regions as a region of interest. At block 904, each candidate region in the rest of the reduced set of candidate regions having an intersection-over-union overlap with the region of interest that is greater than a threshold value can be removed. At block 906, the top candidate region is removed from the reduced set of candidate regions, and the top candidate region is added to a selected list of candidate regions. At block 908, a determination is made as to whether any addition candidate region in the reduced set of candidate regions should be processed. In some implementations, each remaining candidate region in the reduce set of candidate regions can be processed until the reduced set of candidate region is emptied. In some implementations, once the number of candidate regions in the selected list of candidate regions reaches a threshold number, processing of the reduced set of candidate regions can be terminated. A block 910, the selected list of candidate regions is provided as an output of the non-maximum suppression operation. In relation to FIG. 7, blocks 902 to 908 may correspond to the IoU analysis of block 710.

FIG. 10 illustrates a flow diagram of an example of a process 1000 that can be performed by a compiler (e.g., compiler 330 as described with reference to FIG. 3). Process 1000 can be used to generate code for a computing system to execute a NMS operation. Process 1000 may begin at block 1002 by receiving a description of a neural network that includes performing a non-maximum suppression operation on a set of candidate predictions of a computing task. The neural network can be, for example, a neural network to perform object detection.

At block 1004, process 1000 may generate a first set of computer readable code to calculate a standard deviation of a set of confidence scores corresponding to the set of candidate predictions, calculate a confidence score threshold based on the standard deviation, and discard candidate predictions having a confidence score below the confidence score threshold to form a reduced set of candidate predictions. The first set of computer readable code can be code executable on an acceleration engine or on a host processor of the computing system. The calculations for the standard deviation and confidence score can be implemented used the algorithms described above.

At block 1006, process 1000 may generate a second set of computer readable code to derive a result of the non-maximum suppression operation by discarding additional candidate predictions from the reduced set of candidate predictions based on an intersection-over-union overlap metric. The second set of computer readable code can be code executable on an acceleration engine or on a host processor of the computing system. The intersection-over-union overlap operations can be implemented used the algorithms described above.

Figure 11:
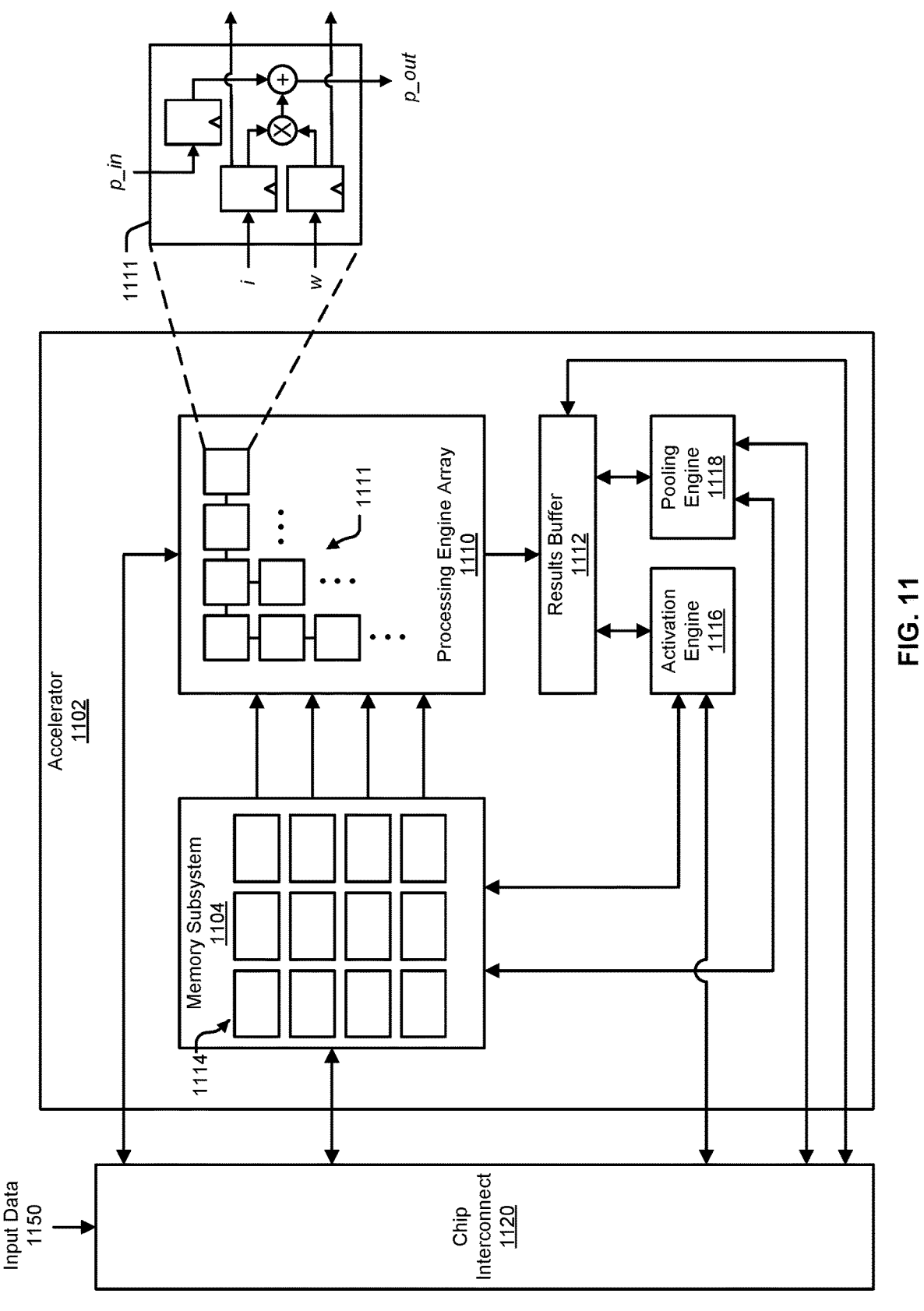
FIG. 11 illustrates a block diagram of an example of an integrated circuit device.

FIG. 11 is a block diagram illustrating an example of an integrated circuit device that can be implemented in an accelerator engine. The example of FIG. 11 illustrates an accelerator 1102. In various examples, the accelerator 1102, for a set of input data (e.g., input data 1150), can execute computations using a processing engine array 1110, an activation engine 1116, and/or a pooling engine 1118. In some examples, the example accelerator 1102 may be an integrated circuit component of a processor, such as a neural network processor. The processor may have other integrated circuit components, including additional accelerator engines. In some implementations, accelerator 1102 may further include an arithmetic logic unit (ALU) to perform mathematical computations that may not be suitable for processing engine array 1110 to handle.

In various implementations, the memory subsystem 1104 can include multiple memory banks 1114. In these implementations, each memory bank 1114 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1114. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1104 can permit simultaneous access to the read or write channels of multiple memory banks. As another example, the memory subsystem 1104 can include arbitration logic such that arbitration between, for example, the outputs of multiple memory banks 1114 can result in more than one memory bank's output being used. In these and other examples, though globally managed by the memory subsystem 1104, each memory bank can be operated independently of any other.

Having the memory banks 1114 be independently accessible can increase the efficiency of the accelerator 1102. For example, values can be simultaneously read and provided to each row of the processing engine array 1110, so that the entire processing engine array 1110 can be in use in one clock cycle. As another example, the memory banks 1114 can be read at the same time that results computed by the processing engine array 1110 are written to the memory subsystem 1104. In contrast, a single memory may be able to service only one read or write at a time. With a single memory, multiple clock cycles can be required, for example, to read input data for each row of the processing engine array 1110 before the processing engine array 1110 can be started.

In various implementations, the memory subsystem 1104 can be configured to simultaneously service multiple clients, including the processing engine array 1110, the activation engine 1116, the pooling engine 1118, and any external clients that access the memory subsystem 1104 over a communication fabric 1120. In some implementations, being able to service multiple clients can mean that the memory subsystem 1104 has at least as many memory banks as there are clients. In some cases, each row of the processing engine array 1110 can count as a separate client. In some cases, each column of the processing engine array 1110 can output a result, such that each column can count as a separate write client. In some cases, output from the processing engine array 1110 can be written into the memory banks 1114 that can then subsequently provide input data for the processing engine array 1110. As another example, the activation engine 1116 and the pooling engine 1118 can include multiple execution channels, each of which can be separate memory clients. The memory banks 1114 can be implemented, for example, using static random access memory (SRAM).

In various implementations, the memory subsystem 1104 can include control logic. The control logic can, for example, keep track of the address spaces of each of the memory banks 1114, identify memory banks 1114 to read from or write to, and/or move data between the memory banks 1114. In some implementations, memory banks 1114 can be hardwired to particular clients. For example, a set of memory banks 1114 can be hardwired to provide values to the rows of the processing engine array 1110, with one memory bank servicing each row. As another example, a set of memory banks can be hard wired to receive values from columns of the processing engine array 1110, with one memory bank receiving data for each column.

The processing engine array 1110 is the computation matrix of the example accelerator 1102. The processing engine array 1110 can, for example, execute parallel integration, convolution, correlation, and/or matrix multiplication, among other things. The processing engine array 1110 includes multiple processing engines 1111, arranged in rows and columns, such that results output by one processing engine 1111 can be input directly into another processing engine 1111. Processing engines 1111 that are not on the outside edges of the processing engine array 1110 thus can receive data to operate on from other processing engines 1111, rather than from the memory subsystem 1104.

In various examples, the processing engine array 1110 uses systolic execution, in which data arrives at each processing engine 1111 from different directions at regular intervals. In some examples, input data can flow into the processing engine array 1110 from the left and weight values can be loaded at the top. In some examples weights and input data can flow from the left and partial sums can flow from top to bottom. In these and other examples, a multiply-and-accumulate operation moves through the processing engine array 1110 as a diagonal wave front, with data moving to the right and down across the array. Control signals can be input at the left at the same time as weights, and can flow across and down along with the computation.

In various implementations, the number of columns in the processing engine array 1110 determines the computational capacity of the processing engine array 1110, and the number of rows determines the required memory bandwidth for achieving maximum utilization of the processing engine array 1110. The processing engine array 1110 can have, for example, 64 columns and 428 rows, or some other number of columns and rows.

An example of a processing engine 1111 is illustrated in FIG. 11 in an inset diagram. As illustrated by this example, a processing engine 1111 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1111.

In the illustrated example, an input from above can include a partial sum, p_in, provided either from another processing engine 1111 or from a previous round of computation by the processing engine array 1110. When starting a computation for a new set of input data, the top row of the processing engine array 1110 can receive a fixed value for p_in, such as zero. As illustrated by this example, i and w are multiplied together and the result is summed with p_in to produce a new partial sum, p_out, which can be input into another processing engine 1111.

Various other implementations of the processing engine 1111 are possible.

Outputs from the last row in the processing engine array 1110 can be temporarily stored in the results buffer 1112. The results can be intermediate results, which can be written to the memory banks 1114 to be provided to the processing engine array 1110 for additional computation. Alternatively, the results can be final results, which, once written to the memory banks 1114 can be read from the memory subsystem 1104 over the communication fabric 1120, to be output by the system.

In some implementations, the accelerator 1102 includes an activation engine 1116. In these implementations, the activation engine 1116 can combine the results from the processing engine array 1110 into one or more output activations. For example, for a convolutional neural network, convolutions from multiple channels can be summed to produce an output activation for a single channel. In other examples, accumulating results from one or more columns in the processing engine array 1110 may be needed to produce an output activation for a single node in the neural network. In some examples, activation engine 1116 can be bypassed.

In various examples, the activation engine 1116 can include multiple separate execution channels. In these examples, the execution channels can correspond to the columns of the processing engine array 1110, and can perform an operation on the outputs of a column, the result of which can be stored in the memory subsystem 1104. In these examples, the activation engine 1116 may be able to perform between 1 and n parallel computations, where n is equal to the number of columns in the processing engine array 1110. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1102 can include a pooling engine 1118. Pooling is the combining of outputs of the columns of the processing engine array 1110. Combining can include for example, computing a maximum value, a minimum value, an average value, a median value, a summation, a multiplication, or another logical or mathematical combination. In various examples, the pooling engine 1118 can include multiple execution channels that can operating on values from corresponding columns of the processing engine array 1110. In these examples, the pooling engine 1118 may be able to perform between 1 and n parallel computations, where n is equal to the number of columns in the processing engine array 1110. In various examples, execution channels of the pooling engine 1118 can operate in parallel and/or simultaneously. In some examples, the pooling engine 1118 can be bypassed.

Herein, the activation engine 1116 and the pooling engine 1118 may be referred to collectively as execution engines. The processing engine array 1110 is another example of an execution engine. Another example of an execution engine is a Direct Memory Access (DMA) engine, which may be located outside the accelerator 1102.

Input data 1150 can arrive over the communication fabric 1120. The communication fabric 1120 can connect the accelerator 1102 to other components of a processor, such as a DMA engine that can obtain input data 1150 from an Input/Output (I/O) device, a storage drive, or a network interface. The input data 1150 can be, for example one-dimensional data, such as a character string or numerical sequence, or two-dimensional data, such as an array of pixel values for an image or frequency and amplitude values over time for an audio signal. In some examples, the input data 1150 can be three-dimensional, as may be the case with, for example, the situational information used by a self-driving car or virtual reality data. In some implementations, the memory subsystem 1104 can include a separate buffer for the input data 1150. In some implementations, the input data 1150 can be stored in the memory banks 1114 when the accelerator 1102 receives the input data 1150.

In some examples, the accelerator 1102 can implement a neural network processing engine. In these examples, the accelerator 1102, for a set of input data 1150, can execute a neural network to perform a task for which the neural network was trained. Executing a neural network on a set of input data can be referred to as inference or performing inference.

The weights for the neural network can be stored in the memory subsystem 1104, along with input data 1150 on which the neural network will operate. The neural network can also include instructions, which can program the processing engine array 1110 to perform various computations on the weights and the input data. The instructions can also be stored in the memory subsystem 1104, in the memory banks 1114 or in a separate instruction buffer. The processing engine array 1110 can output intermediate results, which represent the outputs of individual layers of the neural network. In some cases, the activation engine 1116 and/or pooling engine 1118 may be enabled for computations called for by certain layers of the neural network. The accelerator 1102 can store the intermediate results in the memory subsystem 1104 for inputting into the processing engine array 1110 to compute results for the next layer of the neural network. The processing engine array 1110 can further output final results from a last layer of the neural network. The final results can be stored in the memory subsystem 1104 and then be copied out to host processor memory or to another location.

Figure 12:
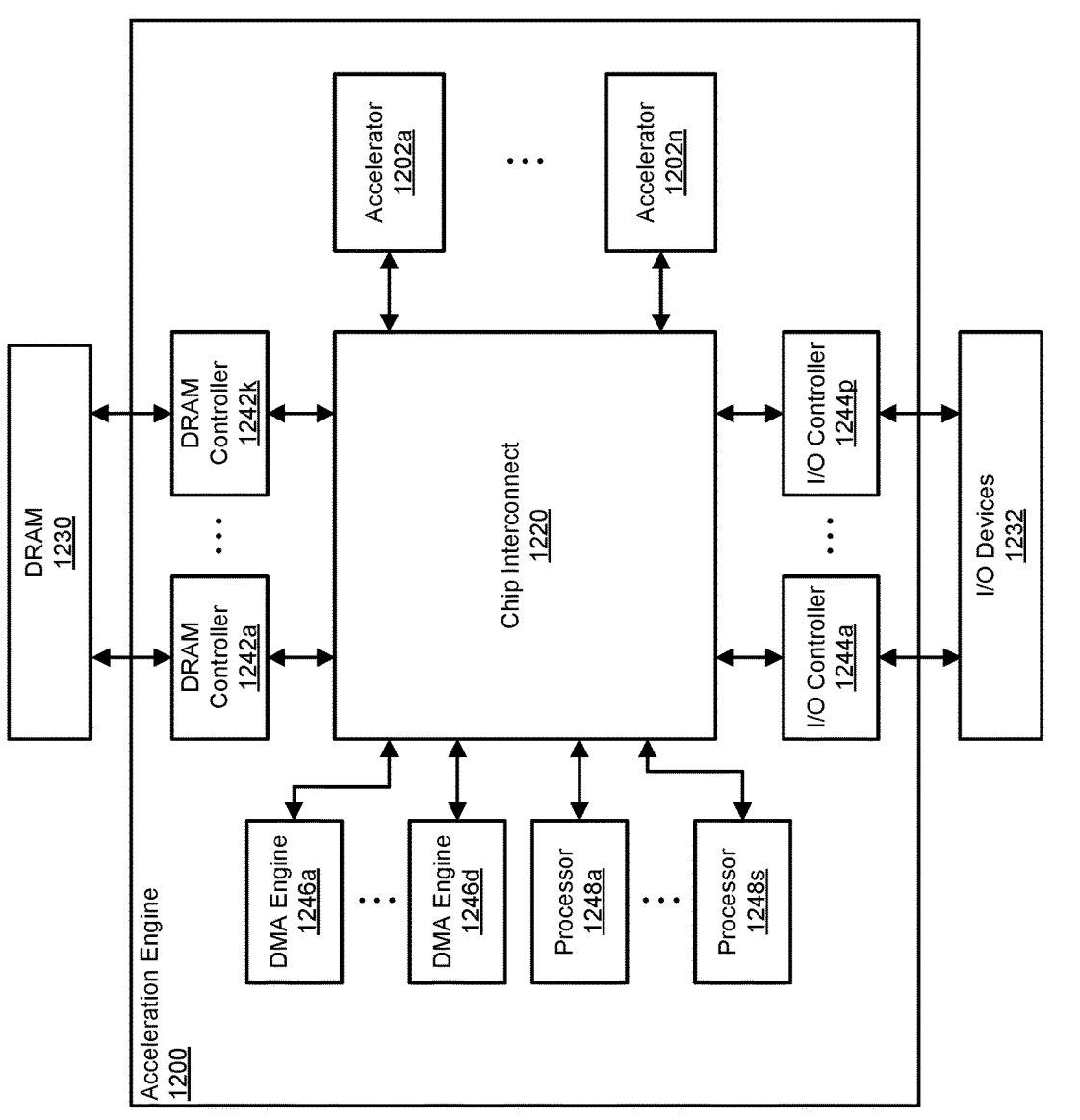
FIG. 12 illustrates a block diagram of an example of an acceleration engine.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 9.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general-purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators 1202a-1202n can be programmed with different programs, so that each performs a different set of operations. In various examples, the processors 1248a-1248s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248a-1248s, which can also be referred to as data management processors. In the example of FIG. 12, the acceleration engine 1200 includes s processors 1248a-1248s incorporated into the device (e.g., on the same silicon die). In other examples, the processors 1248a-1248s can be external to the acceleration engine 1200 (e.g., on a different die and/or in a different package). In some examples, the processors 1248a-1248s can manage the movement of data from I/O devices 1232 to the accelerators 1202a-1202n or the DRAM 1230. For example, input data may be located at an I/O device 1232 or in processor memory, and the processors 1248a-1248s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248a-1248s can be responsible for managing the data movement for a different accelerator. In some examples, a processor may manage the data movement for more than one accelerator. Similarly, in various examples, each of the processors 1248a-1248s can be assigned to one or more DMA engines 1246a-1246d. In these and other examples, associations between processors 1248a-1248s, accelerators 1202a-1202n, and DMA engines 1246a-1246d are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
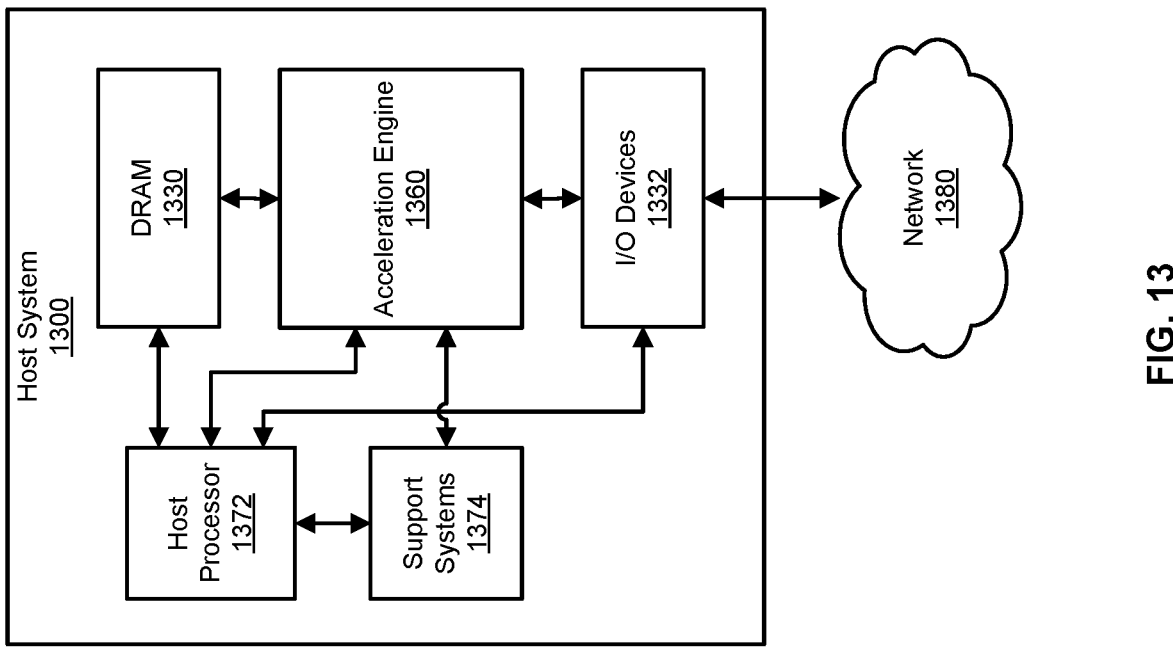
FIG. 13 illustrates a block diagram of an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 12. The example host system 1300 of FIG. 13 includes the acceleration engine 1360, a host processor 1372, DRAM 1330 or processor memory, I/O devices 1332, and support systems 1374. In various implementations, the host system 1300 can include other hardware that is not illustrated here.

The host processor 1372 is a general purpose integrated circuit that is capable of executing program instructions. In some examples, the host processor 1372 can include multiple processing cores. A multi-core processor may include multiple processing units within the same processor. In some examples, the host system 1300 can include more than one host processor 1372. In some examples, the host processor 1372 and the acceleration engine 1360 can be one chip, such as, one or more integrated circuits within the same package.

In various examples, the host processor 1372 can communicate with other components in the host system 1300 over one or more communication channels. For example, the host system 1300 can include a host processor bus, which the host processor 1372 can use to communicate with the DRAM 1330, for example. As another example, the host system 1300 can include an I/O bus, such as a PCI-based bus, over which the host processor 1372 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1372 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1372 can manage the movement of data (such as weights, instructions, intermediate results, results of conditional layers, and/or final results) into or out of the acceleration engine 1360.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1330 is memory that is used by the host processor 1372 for storage of program code that the host processor 1372 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1372. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1380. For example, the host system 1300 can use a network interface to communicate with storage devices, user terminals, other computing devices or servers, and/or other networks, among various examples.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1374 can include hardware for coordinating the operations of the acceleration engine 1360. For example, the support systems 1374 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1372. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1374 can be responsible for taking instructions from the host processor 1372 when programs executing on the host processor 1372 request the execution of a neural network. For example, the host processor 1372 can provide the support systems 1374 with a set of input data and a task that is to be performed on the set of input data. In this example, the support systems 1374 can identify a neural network that can perform the task, and can program the acceleration engine 1360 to execute the neural network on the set of input data. In some examples, the support systems 1374 only needs to select an appropriate neural network processing engine of the neural network processor. In some examples, the support systems 1374 may need to load the data for the neural network onto the acceleration engine 1360 before the acceleration engine 1360 can start executing the neural network. In these and other examples, the support systems 1374 can further receive the output of executing the neural network, and provide the output back to the host processor 1372.

In some examples, the operations of the support systems 1374 can be handled by the host processor 1372. In these examples, the support systems 1374 may not be needed and can be omitted from the host system 1300.

In various examples, the host system 1300 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
a host processor coupled to a host memory; and
an acceleration engine having an accelerator circuit and an accelerator memory,
wherein the computing system is configured to:
    generate a set of confidence scores associated with a set of candidate regions of an image, each of the confidence scores indicating a likelihood that an object of interest is in the corresponding candidate region;
    perform a statistical analysis on the set of confidence scores for the object of interest, the statistical analysis including calculating a mean and a standard deviation of the confidence scores;
    reduce the set of candidate regions into a reduced set of candidate regions by determining a confidence score threshold by adding the mean to a result of multiplying the standard deviation with a user configurable multiplier factor, and discarding candidate regions having a confidence score that is lower than the confidence score threshold to form the reduced set of candidate regions;
    determine which of the candidate regions in the reduced set of candidate regions satisfies an intersection-over-union overlap metric; and
    classify the candidate region that satisfies the intersection-over-union overlap metric.

2. The computing system of claim 1,
wherein the host processor is configured to:
    provide input data to the acceleration engine; and
    determine which of the candidate regions in the reduced set of candidate regions satisfies an intersection-over-union overlap metric; and
wherein the acceleration engine is configured to:
    generate the set of confidence scores;
    perform the statistical analysis; and
    classify the candidate regions.

3. The computing system of claim 1,
wherein the host processor is configured to:
    provide input data to the acceleration engine;
    perform the statistical analysis; and
    determine which of the candidate regions in the reduced set of candidate regions satisfies an intersection-over-union overlap metric; and
wherein the acceleration engine is configured to:
    generate the set of confidence scores; and
    classify the candidate regions.

4. The computing system of claim 1,
wherein the host processor is configured to provide input data to the acceleration engine; and
wherein the acceleration engine is configured to:
    generate the set of confidence scores;
    perform the statistical analysis;

determine which of the candidate regions in the reduced set of candidate regions satisfies an intersection-over-union overlap metric; and classify the candidate regions.

5. A computer-implemented method comprising:

receiving a request to perform a non-maximum suppression operation on a set of candidate predictions of a computing task;

performing a statistical analysis on a set of confidence scores corresponding to the set of candidate predictions to determine a standard deviation of the set of confidence scores;

determining a confidence score threshold based on the standard deviation;

discarding candidate predictions having a confidence score below the confidence score threshold to form a reduced set of candidate predictions; and providing candidate predictions from the reduced set of candidate predictions as a result of the non-maximum suppression operation.

6. The computer-implemented method of claim 5, wherein the statistical analysis has a linear time complexity.

7. The computer-implemented method of claim 5, wherein the statistical analysis includes computing a mean of the confidence scores and a standard deviation of the confidence scores.

8. The computer-implemented method of claim 7, wherein the confidence score threshold is determined by adding the mean to a result of multiplying the standard deviation with a multiplier factor.

9. The computer-implemented method of claim 8, wherein the multiplier factor is a user configurable parameter.

10. The computer-implemented method of claim 8, wherein the multiplier factor is between 1 and 3.

11. The computer-implemented method of claim 8, wherein the multiplier factor is 2.5.

12. The computer-implemented method of claim 5, wherein the set of confidence scores is computed by a neural network model being executed in an accelerator circuit of a computing system.

13. A computer-implemented method comprising:

receiving a request to perform a non-maximum suppression operation on a set of candidate predictions of a computing task, the candidate predictions associated with respective confidence scores;

discarding candidate predictions having a confidence score below a confidence score threshold to form a reduced set of candidate predictions;

discarding additional candidate predictions from the reduced set of candidate predictions based on an intersection-over-union overlap metric; and providing remaining candidate predictions from the reduced set of candidate predictions as a result of the non-maximum suppression operation.

14. The computer-implemented method of claim 13, wherein the candidate predictions being discarded from the reduced set of candidate predictions include candidate predictions having an intersection-over-union overlap with a region of interest being greater than a threshold value.

15. The computer-implemented method of claim 14, wherein the region of interest is a top candidate region in the reduced set of candidate regions.

16. The computer-implemented method of claim 13, wherein the confidence score threshold is based on a user configurable parameter.

17. The computer-implemented method of claim 13, wherein the confidence scores are computed by a neural network model being executed in an accelerator circuit of a computing system.

* * * * *